K. F. LEES.
COMBINED TIRE VALVE, AND GAGE.
APPLICATION FILED OCT. 28, 1919.

1,368,513.

Patented Feb. 15, 1921.

Inventor:
Kenneth F. Lees,
by C. A. Mason, Att'y.

UNITED STATES PATENT OFFICE.

KENNETH F. LEES, OF NEW HAVEN, CONNECTICUT.

COMBINED TIRE VALVE AND GAGE.

1,368,513.   Specification of Letters Patent.   Patented Feb. 15, 1921.

Application filed October 28, 1919. Serial No. 334,071.

*To all whom it may concern:*

Be it known that I, KENNETH F. LEES, a citizen of the United States, residing at New Haven, in the county of New Haven and State of Connecticut, have invented a certain new and useful Improvement in Combined Tire Valves and Gages, of which the following is a full, clear, and exact description.

This invention has reference to certain improvements in combined pressure gages and air valves for use on pneumatic tires. The invention is particularly concerned with devices of this character which are designed for permanent attachment to the valve stem or tube of a tire, so that each tire of the vehicle will be equipped with a combined valve and gage, and the amount of air pressure within each tire may accordingly be determined with ease and facility, whenever desired.

In my prior application for patent, Serial No. 273,615, filed January 28, 1919, now Patent 1,328,572, patented Jan. 20, 1920, a tire test gage is shown and described, which is to be permanently attached to the air valve of each tire of the vehicle, and the tire air pressure indicating means of the gage is so adjusted that it will move only when the pressure within the tire is in excess of that which is calculated as the minimum safety pressure for the tire. The tire air gage to which the present improvements relate is preferably of the type described in said prior application, although the invention is by no means confined to use with gages of this description, or operating necessarily upon this principle.

As is well known, the air pressure within the tires of trucks and large vehicles is greatly in excess of that in the tires of pleasure vehicles, and the novel features of the present invention are designed for preferable use in connection with the tires of the former class of vehicles. The air pressure within the tires of a truck is so high that ordinarily the spring-actuated tire valve is too light to withstand these pressures, and soon wears out and leaks. I, accordingly, employ a positively operated valve which is designed to seat upon the usual air valve tube or nipple, to confine the pressure within the tire. In connection with this type of valve, or independently thereof, a tire pressure gage is used which is arranged to extend laterally of the valve so as to occupy a less amount of radial space than is occupied by the tire gage shown in my prior application. The wheels employed upon trucks and other heavy vehicles are usually so designed that there is a relatively small space between the hub and tire rim, and also between adjacent spokes. In order that the combined tire valve and gage may be readily applied to the usual tire vale stem, I have constructed the device so that the gage is coupled detachably to the air valve casing, so that the air valve casing may be freely rotated in attaching it to the tire valve stem, and thereafter the gage may be coupled to the air valve casing.

Another important feature of the invention is comprised in the construction of the tire air pressure gage whereby it provides an inflating conduit for the tire, in addition to its usual functions. This is accomplished by constructing the gage piston of annular form, and locating centrally thereof a tube or conduit which extends through the indicating cap and is provided with means for connection with an air pressure pump, or other suitable source of air pressure. This results in a very compact construction, and further contributes to a device in which the space between the hub and rim of the tire are utilized without undue complication of parts.

The gage is constructed in such manner that it can be taken off from the valve portion of the device, if necessary, when the tire is removed from the wheel. This is accomplished by providing a screw threaded or other suitable coupling connection between the tire air gage and valve, and it permits removal of the gage from the valve without disturbing the functions of the latter.

The entire construction makes it possible to dispose the combined valve and pressure gage in a very small space as the valve portion may be attached to the end of the usual tire valve tube first, and thereafter the gage as a unit may be coupled to the side of the valve casing. Such capacity for assembly and disassembly of the gage is an important feature of the invention.

Other features of invention, such as important details of construction and combinations of parts, will be hereinafter more fully described with reference to the accompanying drawings, and will be pointed out with particularity in the claims.

Figure 1:
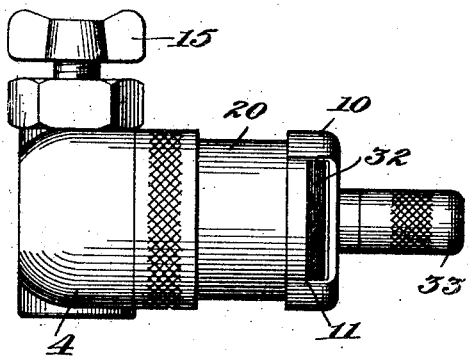
Figure 1 illustrates, in side elevation, a combined tire air valve and gage embodying the present invention.
Figure 2:
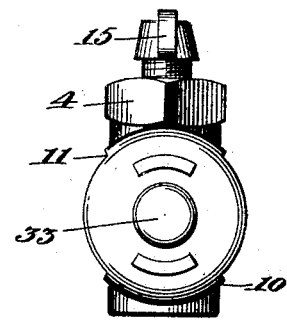
Fig. 2 is an end elevation.
Figure 3:
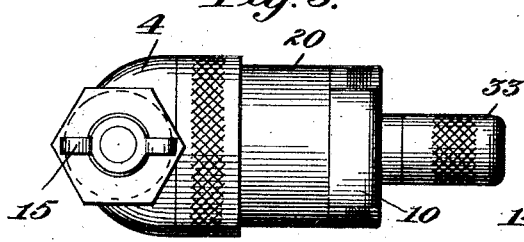
Fig. 3 is a plan view.

The air valve casing, proper, 4 is constructed with an internal thread which receives a threaded bushing 7, and said bushing has threaded connection with the upper reduced end portion 6 of the usual tire air valve tube or casing 5. A valve stem 14, which is externally threaded and meshes with an internal thread in the upper portion of the casing 4, is provided with a handle portion 15 at one end, and at its opposite end is externally threaded to receive the internal threads of a cap 16, a chamber being formed inside the said cap and the end of the valve stem 14, which receives loosely, a ball 18 at the extremity of a valve stem 18$^a$ of a double conical air valve 17. The valve 17 is provided with one conical face which seats in a conical seat formed at the upper end of the reduced portion 6 of the tire air valve tube 5, and an oppositely disposed conical face which is adapted to a similarly shaped valve seat 25 formed in a bushing 8, which has threaded engagement with the interior of the casing 4. The bushing 8 is provided with a central perforation or opening which establishes communication between the upper and lower portions of the interior of the valve casing 4.

The valve 17 is a floating, or self-seating valve, by reason of the ball and socket connection between said valve and its operating stem 14. Said valve is adapted to be moved into engagement with the valve seat on the tire air valve tube 5 for the purpose of confining the air under pressure within the tire. When the valve is lifted from its seat on the tire air valve, and is moved into engagement with the seat 25 in the bushing 8, air is prevented from passing from the tire to the upper portion of the casing 4. The latter is provided with an opening 26 which is in communication with a small opening 22 leading from an annular groove 22$^a$ formed in the side portion of the tire air gage casing 20. The casing 20 is bored and finished interiorly to form a cylinder which receives an annular plunger 23, having a cupped packing which is riveted to a flange 23$^a$ from which extend guides 24 which pass freely through openings in a cap 9, which is in threaded engagement with the outer end of the casing 20, and closes said end. A tire air gage spring 12 is confined between the flange 23$^a$ and the cap 9, and is so adjusted as to its tension that it will prevent movement of the test gage plunger 23 until the pressure admitted to said plunger from the tire is in excess of the minimum safety air pressure of the tire. While this is preferable, it is to be understood that the invention is not by any means confined to providing a test gage plunger spring which is so adjusted, as the present improvements are applicable to tire air test gages generally.

The casing 20 is provided at its inner end with a reduced hub or extension 21 having an external thread which engages an internal thread in a socket formed in one side of the casing 4. The central reduced extension 21 is a prolongation of a tube 25 which extends centrally through the casing 20 and the plunger 23, and its outer end passes through a central opening in the cap, and is herein shown as provided with an internal thread which meshes with an external thread on a tire inflating nipple 29. The nipple 29 is provided interiorly with a shoulder upon which seats a spring-actuated air valve 30, having a stem 31 which is guided in the bore 28 of the tubular extension 25. The bore 28 registers with a hole in the casing 4, and when the tire is being inflated air under pressure passes from the inflating nipple through the bore 28 and the registering hole in the casing 4, and thence into the tire.

The inner portion of the casing 20 is externally threaded to receive an internally threaded coupling sleeve 29, which also has threaded engagement with an external thread formed upon a circular extension of the casing 4. The coupling sleeve provides a connection between the casings 4 and 20, and by rotating said sleeve to the left and also rotating the gage body to unscrew extension 21 from casing 4, the air gage may be completely disconnected from the air valve casing, as will be apparent.

The extensions 24 are riveted or otherwise rigidly connected with a cap 10, which has a depending portion sliding over the cap 9, and which constitutes the indicating element of the tire gage. Preferably, oppositely located portions of the cap 10 are cut out or removed leaving openings as shown at 11, and the underlying cap 9 may be provided with a red band 32, for indicating the maximum tire pressure.

Figure 4:
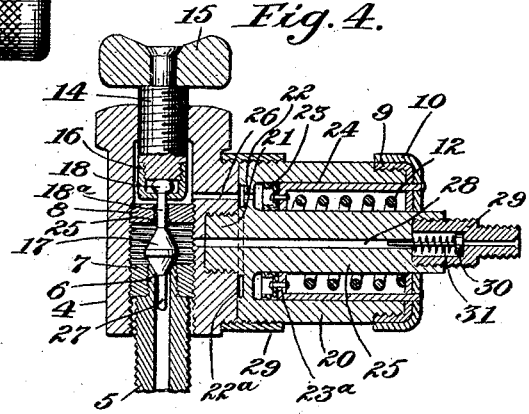
Fig. 4 is a longitudinal vertical section.

In the use of the device it will be understood that the valve stem 14 is normally in the position shown in Fig. 4, and the valve 17 is in firm engagement with its seat upon the end of the tire valve nipple 6, thereby confining the air under pressure within the tire. If it is desired to test the tire air pressure, the operator rotates the handle 15 to the left thereby raising the valve 17 from its seat on the tire valve tube, and permitting the escape of air under pressure which passes out of the tire, through the opening in the bushing 8, thence through the opening 26 to the plunger 23, and, if the pressure is sufficient, the plunger will be moved outward carrying with it the tire test indicating cap 10. If the pressure is sufficient to move the cap 10, it will indicate that the tire is not under-inflated. In the event that the tire is under-inflated, the cap 10 will not move. The operator will then continue to rotate the handle 15 to the left until the valve 17 is raised sufficiently to cause its upper conical face to engage the seat 25, thereby preventing access of air under pressure to the plunger 23. The tire is then ready to be inflated, and the nipple 29 will be connected with an air pump or other source of air pressure, and the inflating operation will be carried out. During such operation the plunger 23 is sealed against the air pressure, and will, of course, not move. If at any time during the inflation operation it is desired to test the pressure, the handle 15 will be rotated slightly to the right, thus permitting air under pressure to pass to the lower side of the plunger, the latter being raised if the pressure is sufficient to overcome the tension of the spring 12. In the event that such pressure should be in excess of the maximum safety tire pressure, the cap 10 will be moved over the cap 9 until it passes the lower edge of the red band 32, and the operator may then cease inflating the tire, and permit sufficient air to escape therefrom to reduce the pressure to the proper amount.

If it be desired at any time to disconnect the air gage from the valve 17, the sleeve 29 may be rotated in a direction to uncouple the casing 20 from the casing 4, and the latter will then be rotated to cause disengagement between the reduced extension 21 and the threaded socket in the side of the casing 4, which receives said extension. Removal of the gage from the air valve 17 will, of course, leave the latter in position to retain the air under pressure within the tire, and accordingly the air pressure gage may be repaired or adjusted at any time without disturbing the assembly of the tire air valve. Removal of the gage also permits the valve casing 4 to be rotated from removal from the stem 5, without interference by the spokes which are so close together in trucks as to prevent such rotation when casing 20 is attached to the gage.

Having thus described my invention, what I claim as new and desire to secure by Letters Patent of the United States, is:—

1. In a device of the class described, the combination with a casing arranged to be connected with a tire air valve stem, of a positively operated valve in said casing to seat upon the open outer end of said stem for confining the air under pressure within the tire, and a tire air pressure gage disposed in angular relation to said valve.

2. In a device of the class described, the combination with a casing arranged to be connected with a tire air valve stem, a positively operated valve in said casing constructed to seat upon said stem, and an air presure gage disposed angularly with respect to said casing, said valve being constructed to control the admisison of air presure to said gage.

3. In a device of the class described, the combination with a valve casing arranged for connection with a tire air valve stem, a partition in said casing, a positively operated valve constructed to seat upon the tire air valve stem or upon said partition, and an air pressure gage extending laterally from said casing and provided with a port in communication with said casing on the opposite side of said partition from that occupied by said valve.

4. In a device of the class described, the combination with a valve casing arranged for connection with a tire air valve stem, of a positively operated valve in said casing, a tire gage extending at right angles to said casing, an opening establishing communication between said gage and said valve casing, said valve being constructed to open communication between the interior of the tire and said gage or to cut off said communication at will.

5. In a device of the class described, the combination with a valve casing for connection with a tire air valve stem, of a double conical floating valve within said casing, a tire gage extending angularly from said casing, means for establishing comunication between said valve casing and tire gage, and means for connecting said tire gage with a tire inflating device, said valve being constructed and arranged to establish communication between the interior of the tire and said gage, and to seal said gage against air pressure when the tire is being inflated, at will.

6. In a device of the class described, the combination with a valve casing for connection with a tire air valve stem and a double-faced valve therein, of a gage casing extending laterally from said valve casing, a spring-pressed plunger in said gage casing, a central tubular member in said gage casing having means for connection with a tire inflating device and communicating with said valve casing, an opening between said valve casing and said plunger, and a partition in the valve casing located between the last-named opening and the inflating connection, said valve being arranged to seat alternately upon said partition and the tire air valve stem.

7. In a device of the class described, the combination with a valve casing for connection with a tire air valve stem, of a gage casing connected to one side of said valve casing and having a spring-pressed plunger therein, means for inflating the tire including a conduit located centrally of said plunger and in communication with said valve casing, a partition in said valve casing, and a double faced floating needle valve in said casing arranged to seat alternately upon said partition and the tire air valve stem.

8. In a device of the class described, the combination with a valve casing for connection with a tire air valve stem, of a tire air pressure gage including a plunger and indicating means having detachable connection with one side of said valve casing, an inflating tube extending centrally of said plunger, ports establishing communication between said tube and said plunger, a partition in the valve casing located intermediate said ports, and a double faced conical needle valve positively operated and arranged to seat, alternately, upon said partition and the tire air valve stem for controlling the admission of air under pressure from the tire to the plunger, and between the inflating means and said plunger, at will.

In testimony whereof I have hereunto set my hand this 27th day of October, A. D. 1919.

KENNETH F. LEES.

Witnesses:
AGNES KENNEALY,
MARION BRANNACK.